US007242319B2

(12) United States Patent
Madlener et al.

(10) Patent No.: US 7,242,319 B2

(45) Date of Patent: Jul. 10, 2007

(54) RECEIVING STATION, MEASUREMENT SENSOR AS WELL AS A MEASUREMENT SYSTEM HAVING A RECEIVING STATION AND HAVING A MEASUREMENT SENSOR

(76) Inventors: Wolfgang Madlener, Am Reutehof 42, 88213 Ravensburg (DE); Wilfried Veil, Am Langholz 11, 88289 Waldburg (DE)

( * ) Notice: Subject to any disclaimer, the term of this patent is extended or adjusted under 35 U.S.C. 154(b) by 320 days.

(21) Appl. No.: 10/926,247

(22) Filed: Aug. 26, 2004

(65) Prior Publication Data

US 2005/0052289 A1 Mar. 10, 2005

(30) Foreign Application Priority Data

Sep. 4, 2003 (DE) ................................ 103 41 218

(51) Int. Cl.
*G08C 19/22* (2006.01)
*H04Q 9/00* (2006.01)

(52) U.S. Cl. ................. 340/870.07; 455/62; 455/67.13

(58) Field of Classification Search ........... 340/870.07, 340/870.11, 2.2; 455/62, 67.13
See application file for complete search history.

(56) References Cited

U.S. PATENT DOCUMENTS 4,780,885 A * 10/1988 Paul et al. .................. 375/267
6,535,766 B1 * 3/2003 Thompson et al. ........... 607/60

* cited by examiner

*Primary Examiner*—Timothy Edwards, Jr.
(74) *Attorney, Agent, or Firm*—Breneman & Georges; William D Breneman

(57) ABSTRACT

A receiving station (7) is proposed, having a receiving unit which is designed for radio reception of data from a measurement sensor (1), with two or more channels at different frequencies being available for selection for data transmission, which can receive data continuously from the measurement sensor on a current channel when in standby. According to the invention, a control unit (1) is provided, which scans the frequencies of the channels and blocks those channels for further selection in which a predefined interference level is exceeded. A measurement sensor as well as a measurement system having a receiving station and having a measurement sensor are also proposed.

24 Claims, 1 Drawing Sheet

Figure 1A:
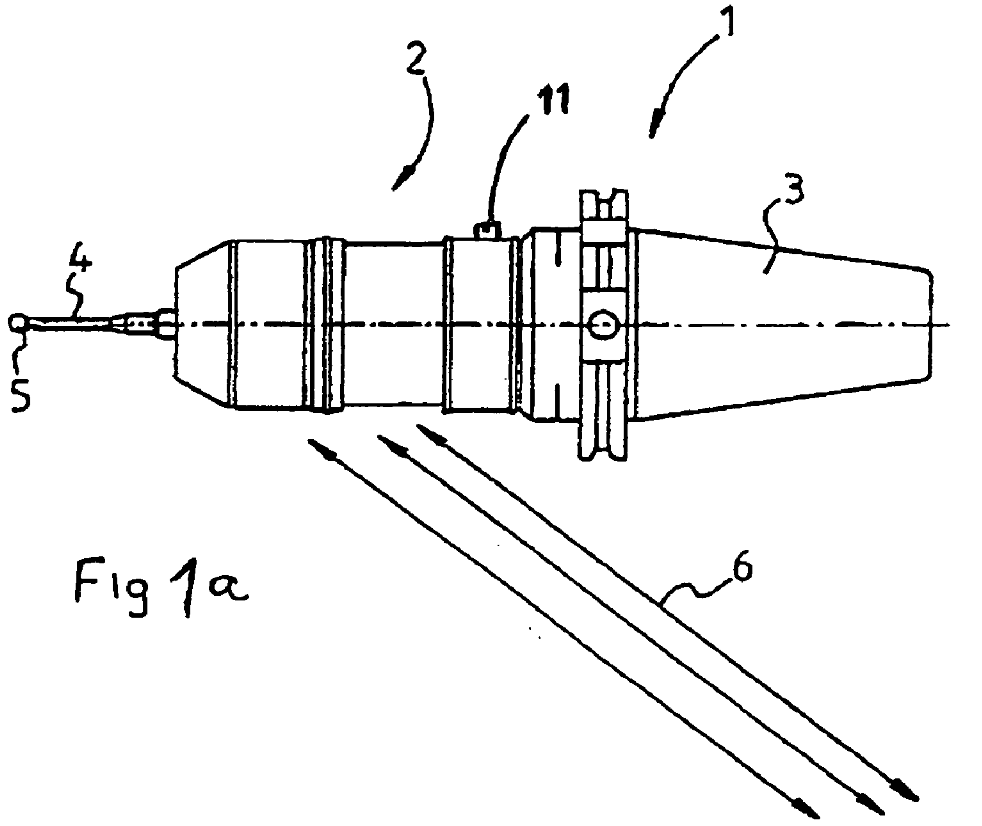

RECEIVING STATION, MEASUREMENT SENSOR AS WELL AS A MEASUREMENT SYSTEM HAVING A RECEIVING STATION AND HAVING A MEASUREMENT SENSOR

CROSS REFERENCE TO RELATED APPLICATIONS

Not applicable.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

REFERENCE TO A "MICROFICHE APPENDIX"

Not applicable.

BACKGROUND OF THE INVENTION (1) Field of the Invention

The invention relates to a receiving station and to a measurement sensor having a receiving unit for the radio reception of data from a measurement sensor with two or more available channels at different frequencies for data transmission which can continuously receive data from a measurement sensor on a current channel when it is on standby. The invention also pertains to a measurement sensor having a transmitting device for the radio transmission of data to a receiving station in which two or more channels are available at different frequencies for the selection of data transmission in which the measurement sensor has a receiving device for the radio reception of data and can change from a current channel to a different channel which is determined by receiving predetermined control data and to a measurement system having a receiving station and a measurement sensor. More particularly the invention pertains to a control unit which scans the frequencies of the channels and blocks those channels for further selection when a predetermined interference level is exceeded.

(2) Description Of Related Art Including Information Disclosed Under 37 C.F.R. 1.97 and 1.98

Measurement probes are regularly used for measurement of workpieces on machine tools. In the case of one known embodiment, measurement data which is recorded by the measurement probe is transmitted by radio to a receiving station for further processing. Normal channels which can be selected manually are normally available for radio transmission.

Thus, in the situation where one channel is subject to interference, it is possible to select a different channel, in which there is less interference or no interference. The manual selection has to be made at the receiving station and in a corresponding manner, on the measurement probe.

It may be necessary to manually change the channel a number of times in order to find a good channel.

BRIEF SUMMARY OF THE INVENTION

The invention is based on the object of designing the radio transmission between a receiving station and a measurement sensor to be more efficient.

This object is achieved by having a receiving station with a receiving unit which is designed for radio reception of data from a measurement sensor with two or more channels being available for selection for data transmission which can receive data continuously from the measurement sensor on a current channel when in standby and a control unit which scans the frequencies of the channels and blocks those channels for further selection when a predetermined interference level is exceeded. A further object of the invention is achieved by having a measurement sensor having a transmitting device for radio transmission of data to a receiving station in which two or more channels at different frequencies are available for selection for data transmission wherein a measurement sensor has a receiving device for the radio reception of data and is designed to change from a current channel to a different channel by control data on receiving predetermined control data. The advantages of the invention are further achieved by having a receiving station as heretofore discussed having a measurement sensor as heretofore discussed.

Additional advantages of the invention can be achieved by providing means for providing the manual selection of channels which preferably block channels in which a predetermined interference level is exceeded, providing means for the manual enabling of blocked channels, providing a control unit designed to signal the channel or frequency with the lowest interference level, allowing for the application of a supply voltage for a predetermined interval to a control unit to signal a channel with a better frequency or interference level, to provide a transmission unit which transmits control data to a measurement sensor when an interference level on a current channel is exceeded to allow the measurement sensor to automatically change the channel determined by the receiving station and providing the measurement sensor with a receiving device for the radio reception of data that is designed to change from a current channel to a different channel which is predetermined by the control data on receiving predetermined control data.

First of all, the invention is based on a receiving station having a receiving unit which is designed for radio reception of data from a measurement sensor, with two or more channels at different frequencies being available for selection for data transmission, which can receive data continuously from the measurement sensor on a current channel when in standby. The essence of the invention is now the provision of a control unit which scans the frequencies of the channels and blocks those channels for further selection in which a predefined interference level is exceeded. This procedure from the start avoids a situation in which switching takes place to a channel which is itself subject to interference when a channel change is made, for example as a result of interference on the current channel. This results in deliberate and reliable channel selection instead of a trial and error method for channel adjustment, which, in the end, improves the reliability of the data transmission from a measurement sensor to the receiving station.

The receiving station preferably has a mains supply and has communication options, for example to a computer unit, in particular of a machine tool.

In a further, particularly advantageous refinement of the invention, means are provided for manual selection of channels, and are designed such that blocked channels are not offered for manual selection. This procedure makes it possible to ensure that, when a manual channel change takes place, the only channels which are ever selected are those whose interference level is acceptable.

In order to maintain a high degree of flexibility in the selection of channels even when channels which are subject to interference are automatically blocked, it is also proposed that means be provided for manually enabling blocked frequencies.

One refinement of the invention, which is furthermore particularly preferred, or further improvement of the transmission conditions proposes that, after application of the supply voltage for a predetermined interval, the control unit is designed to signal, if available, a better channel, or a better frequency, than the current channel or the current frequency, respectively. This may be achieved, for example, visually or audibly, for example with the channel being indicated on a display. This provides the user with the capability to switch to this channel or the frequency. The control unit is preferably also designed such that a preset channel on which communication is taking place is indicated once the predetermined time interval has elapsed.

In another advantageous refinement to the invention, the control unit offers the channel or the frequency with the lowest interference level. This makes it possible to achieve a high degree of reliability for data transmission.

In another advantageous embodiment of the invention, the receiving station has a transmission unit which transmits control data to the measurement sensor when the interference level on the current channel is exceeded, in order that the measurement sensor automatically changes from the current channel to a channel which is predetermined by the receiving station, and to which the receiving station also changes.

A system comprising a receiving station and a measurement sensor can thus be automatically optimized for radio transmission. In this embodiment, however, the measurement sensor should be appropriately matched to the receiving station by the measurement sensor having a transmission device for radio transmission of data to a receiving station, with two or more channels at different frequencies being available for selection for data transmission and, according to the invention, the measurement sensor having a receiving device for radio reception of data and being designed such that, on receiving predetermined control data, a change is made from a current channel for transmission to a different channel, in particular to a channel which is predetermined by the control data of the receiving station. The rest of the communication between the receiving station and the measurement sensor can then take place on this channel, in particular bidirectionally.

In principle, it is feasible for the scanning and blocking of channels also and alternatively to be carried out by the measurement sensor, with appropriate instructions for channel setting being passed to the receiving station. If only the measurement sensor has this functionality, the tasks of the measurement sensor and receiving station are in this case interchanged, so to speak, in terms of the scanning and blocking of channels and the transmission of instructions for channel setting.

A measurement system preferably has a receiving station as described above and a measurement sensor which has at least one transmission device for radio transmission of data to a receiving station, with two or more channels at different frequencies being available for selection for data transmission.

In one preferred refinement of the invention, the measurement sensor may, however, also receive radio data from the receiving station, and is designed to change from a current channel to a different channel, in particular to a channel which is predetermined by the control data, on receiving predetermined control data, on which the rest of the communication then takes place.

BRIEF DESCRIPTION OF THE SEVERAL VIEWS OF THE DRAWING(S)

One exemplary embodiment of the invention is illustrated in the drawings, and will be explained in more detail, indicating further advantages and details.

The figure shows a measurement probe (FIG. 1*a*) with a receiving station (FIG. 1*b*), in each case in the form of a side view.

DETAILED DESCRIPTION OF THE INVENTION INCLUDING BEST MODE

The figure shows a measurement probe 1 with a cylindrical housing 2, an accommodation cone 3 as well as a probe pin 4 with a measurement ball 5. The accommodation cone 3 may be connected to the tool shaft of a processing machine by insertion into a corresponding hollow cone, for example on such a tool shaft of a processing machine. The probe pin 4 is preferably mounted such that it can tumble and, when in the rest position, is normally located on the axis of the measurement probe 1.

The measurement probe 1 has a transmitting and receiving direction (not illustrated) which, in the exemplary embodiment, is battery-powered and whose activity is symbolized by the three double-headed arrows 6. The measurement probe 1 can communicate with a receiving station 7, which has a housing 8 with a power supply cable 9 and an antenna 10.

Figure 1B:
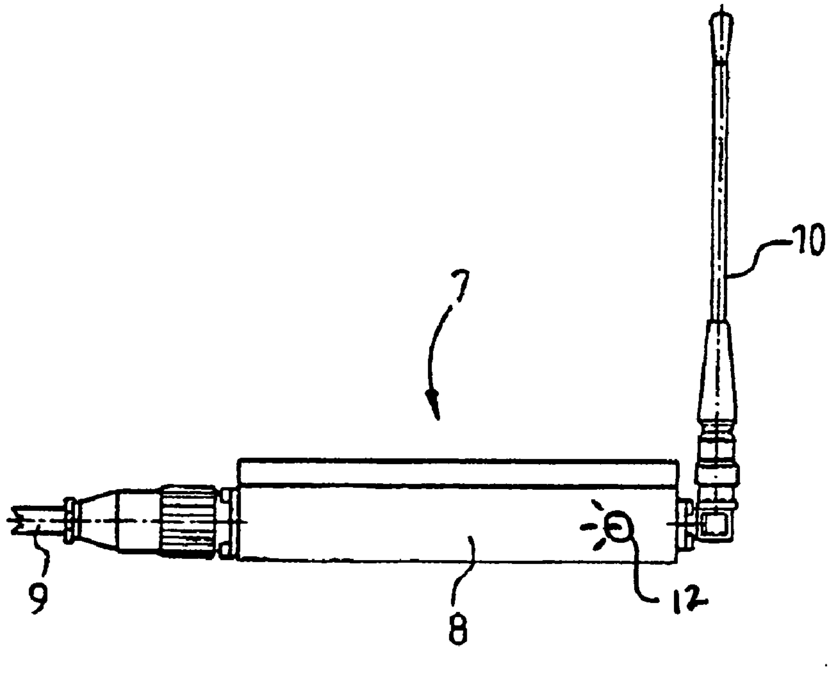

Like the measurement probe, the receiving station likewise has a transmitting and receiving device (not illustrated) and a display (likewise not illustrated) for displaying a selected transmission channel. In order to allow communication between the measurement probe 1 and the receiving station 7 in at least one direction, preferably from the receiving station to the measurement probe, the transmission channel of the receiving station must correspond to the receiving channel of the measurement probe. The channel can be set manually on the measurement probe 1 by manual control knob 11 (FIG. 1*a*) and on the receiving station 7 by manual control knob 12 (FIG. 1*b*).

The receiving station 7 is ready to receive all the time, in order not to "miss" data transmitted from the measurement probe 1.

While ready to receive, a control unit in the receiving station 7 checks the transmission channels for interference signals. Depending on the level of the interference signal or the respective channel, a "list" may be produced, for example in a memory in the receiving station, in which the channels are listed sorted on the basis of the interference signal levels. Channels which exceed a predetermined interference level are blocked for further selection. Should the current channel be subject to interference to an undesirable extent, the receiving station can automatically change channel, and can initiate a corresponding change in the channel for the measurement probe via appropriate control commands, which are sent to the measurement probe.

The change is preferably made to the channel with the lowest interference level.

If the measurement probe and the receiving station are designed in the manner just described, place in the best-possible manner.

It is thus possible to continuously react to electromagnetic interference sources which exist at a specific usage location. Furthermore, efficient adaptation can be carried out on sporadically occurring "interference sources".

In order to ensure that the system comprising the measurement probe and the receiving station is always operational, blocked frequencies can automatically be enabled in predetermined system states, for example if all the channels have been classified as being blocked. The system will then start the channel check for interference sources, and will block channels, once again. In very rare situations, it is possible for the interference level in all of the channels once again to be such that all of the channels are once again blocked at the end. However, this situation can virtually never arise in a normal working environment.

Otherwise, the system indicates an environmental problem, which can then be dealt with appropriately.

LIST OF REFERENCE SYMBOLS

1 Measurement probe
2 Housing
3 Accommodation cone
4 Probe pin
5 Measurement ball
6 Arrow
7 Receiving station
8 Housing
9 Power supply cable
10 Antenna

What is claimed is:

1. A receiving station (7) having a receiving unit for radio reception of data from a measurement sensor (1), said receiving unit having two or more channels at different frequencies available for selection of data transmission, and for continuously receiving data from the measurement sensor on a current channel when in standby, wherein the improvement comprises a machine measurement probe which in operation is in constant communication with a receiving station and a control unit having a measurement sensor (1) which scans the frequencies of the channels for interference and blocks channels in which a predefined interference level is exceeded.

2. The receiving station as claimed in claim 1, further comprising means for manual selection of channels in which blocked channels are not offered for manual selection.

3. The receiving station as claimed in claim 1 or 2 further comprising means for manual enabling of blocked frequencies.

4. The receiving station as claimed in claim 1 wherein, after application of a supply voltage for a predetermined interval, the control unit is designed to signal a channel, if available, with a better interference level, or a better frequency, than the current channel or the current frequency.

5. The receiving station as claimed in claim 4, wherein the control unit is designed to signal the channel or the frequency with the lowest interference level.

6. The receiving station as claimed in claim 1 or 2 further comprising a transmission unit which transmits control data to the measurement sensor (1) when the interference level on the current channel is exceeded, in order that the measurement sensor (1) automatically changes from the current channel to a channel which is predetermined by the receiving station (7), and to which the receiving station also changes.

7. A measurement system having a transmitting device for radio transmission of data to a receiving station (7), in which two or more channels at different frequencies are available for selection for data transmission, wherein the improvement comprises a machine measurement probe for communicating with said receiving station (7) and a control unit having a measurement sensor (1) having a receiving device for radio reception of data and having an ability to change from a current channel to a different predetermined standby channel determined by control data, on receiving said control data from said control unit.

8. The measurement system of claim 7 wherein said measurement sensor (1) has two or more channels at different frequencies available for transmission of data.

9. The measurement system as claimed in claim 8, in which the measurement sensor (1) has a receiving device for radio reception of data and is designed to change from a current channel to a different channel, in particular to a channel which is predetermined by the control data, on receiving predetermined control data.

10. The receiving station as claimed in claim 2 wherein, after application of a supply voltage for a predetermined interval, the control unit is designed to signal a channel, if available, with a better interference level, or a better frequency, than the current channel or the current frequency.

11. The receiving station as claimed in claim 10, wherein the control unit is designed to signal the channel or the frequency with the lowest interference level.

12. A receiving station device comprising:

(a) a transmission station for transmitting and receiving data from a measurement sensor in communication with a scanning and blocking unit for scanning at least two channels or frequencies said transmission station receiving or transmitting control data to said measurement sensor;

(b) a scanning and blocking unit for scanning the level of interference on said at least two channels or frequencies and blocking a channel or frequency that exceeds a predetermined level;

(c) a measurement sensor in communication with said scanning and blocking unit and said transmission station, said measurement sensor transmitting and receiving data on at least two channels or frequencies and for transmitting or receiving control data; and (d) a control unit for transmitting control data between said transmission station and said measurement sensor to automatically change said transmission station and said measurement sensor from a current channel or frequency to a new channel or frequency determined by said scanning and blocking unit.

13. The receiving station device of claim 12 wherein said control unit is disposed in said transmission station.

14. The receiving station device of claim 13 further comprising a device for the manual selection of channels.

15. The receiving station device of claim 14 wherein said device for the manual selection of channels is blocked by said scanning and blocking unit.

16. The receiving station device of claim 12 wherein said control unit is disposed in said measurement sensor.

17. The receiving station device of claim 16 further comprising a device for the manual selection of channels.

18. The receiving station device of claim 17 wherein said device for the manual selection of channels is blocked by said scanning and blocking unit.

19. A measurement system with a receiving station (7) having a receiving unit for radio reception of data from a measurement sensor (1), said receiving unit having two or more channels at different frequencies available for selection of data transmission, and for continuously receiving data from the measurement sensor on a current channel when in standby, wherein the improvement comprises a processing machine measurement probe and a control unit, which scans the frequencies of the channels for interference in which two or more channels at different frequencies are available for data transmission and blocks channels in which a predefined interference level is exceeded, said measurement sensor (1) having a transmitting device for radio transmission of data to a receiving station (7).

20. The measurement system as claimed in claim 19, in which the receiving station further comprises means for manual selection of channels, in which blocked channels are not offered for manual selection.

21. The measurement system as claimed in claim 20, in which the receiving station further comprises means for manual enabling of blocked frequencies.

22. The measurement system as claimed in claim 19, wherein after application of a supply voltage for a predetermined interval, the control unit is designed to signal a channel, if available, with a better interference level, or a better frequency than the current channel or the current frequency.

23. The measurement system as claimed in claim 19, with said receiving station, wherein the control unit is designed to signal the channel or the frequency with the lowest interference level.

24. The measurement system as claimed in claim 19, in which the receiving station further comprises a transmission unit which transmits control data to the measurement sensor (1) when the interference level on the current channel is exceeded to cause the measurement sensor (1) to automatically change from the current channel to a channel predetermined by the receiving station (7), and to which the receiving station also changes.

* * * * *